United States Patent [19]

Barbagelata et al.

[11] Patent Number: 4,821,108
[45] Date of Patent: Apr. 11, 1989

[54] FLEXIBLE IMAGE ACQUISITION AND PROCESSING SYSTEM

[75] Inventors: Giuseppe Barbagelata; Ercole Giuliano, both of Genoa, Italy

[73] Assignee: Elettronica San Giorgio - ELSAG S.p.A., Genova-Sestri, Italy

[21] Appl. No.: 935,341

[22] Filed: Nov. 26, 1986

[30] Foreign Application Priority Data

Nov. 29, 1985 [IT] Italy .............................. 68002 A/85

[51] Int. Cl.⁴ ............................................. H04M 1/40
[52] U.S. Cl. ....................................... 358/282; 382/52
[58] Field of Search ................... 358/282, 280; 382/52

[56] References Cited

U.S. PATENT DOCUMENTS 4,174,528 11/1979 White ................................. 358/282
4,520,395 5/1985 Abe ................................... 358/282
4,567,527 1/1986 Yokomizo .......................... 358/282

Primary Examiner—Edward L. Coles, Sr.
Attorney, Agent, or Firm—Gifford, Groh, Sheridan, Sprinkle and Dolgorukov

[57] ABSTRACT

A flexible image acquisition and process system comprising photosensor means supplying analogue output signals for compensating and digital conversion means for supplying digital output signals representing the image; timing means for controlling scanning of the photosensor means; means for performing two-dimensional convolutions of data representing the images; and system operating phase control means. The main characteristic of the aforementioned system consists in the fact that the control means comprise a processing unit for calculating first compensating values for standardizing to a given value the analogue output signals for single photoelements on the aforementioned photosensor means under dark conditions, and for calculating second conpensating values for standardizing the output signals for the aforementioned single photoelements on the aforementioned photosensor means under normal lighting conditions of the scene defining the aforementioned images, the aforementioned first and second compensating values being stored in a non-volatile memory on the aforementioned control means; and in the fact that the aforementioned control means are also designed for selecting and modifying the operating coefficients employed by the convoluting means.

28 Claims, 10 Drawing Sheets

| | | |
|---|---|---|
| D300 | D200 | D100 |
| D301 | D201 | D101 |
| D302 | D202 | D102 |
| D303 | D203 | D103 |
| D304 | D204 | D104 |
| D305 | D205 | D105 |
| D306 | D206 | D106 |
| D307 | D207 | D107 |
| D308 | D208 | D108 |
| D309 | D209 | D109 |

DATI PIXEL N
DATI PIXEL N+1

| | | |
|---|---|---|
| $W_{18}$ | $W_9$ | $W_0$ |
| $W_{19}$ | $W_{10}$ | $W_1$ |
| $W_{20}$ | $W_{11}$ | $W_2$ |
| $W_{21}$ | $W_{12}$ | $W_3$ |
| $W_{22}$ | $W_{13}$ | $W_4$ |
| $W_{23}$ | $W_{14}$ | $W_5$ |
| $W_{24}$ | $W_{15}$ | $W_6$ |
| $W_{25}$ | $W_{16}$ | $W_7$ |
| $W_{26}$ | $W_{17}$ | $W_8$ |

FLEXIBLE IMAGE ACQUISITION AND PROCESSING SYSTEM

BACKGROUND OF THE INVENTION

The present invention relates to a flexible image acquisition and processing system comprising an electrooptical transducer for converting light signals into electric signals; an analogue-level video signal amplifying and processing stage; a multilevel analogue-digital converter for supplying digital output signals representing the said image; a digital video signal two-dimensional convoluting stage; and means for controlling the operating phases of the said system, which is thus suitable for employment on an image processing system comprising subsequent "high-level" processing modules based on more complex algorithms.

In recent years, image processing systems have played a decisive role in the development of numerous applications including optical text/graphic reading and, in particular, image acquisition from microfilms, automatic readers for sorting mail, and image acquisition from documents, for both video reproduction and automatic character identification.

The above applications all pose particularly severe demands (for example, image acquisition from microfilms is hindered by the minute size of the object involved, by flaws in the film, and by dust; whereas, image acquisition for mail sorting is hindered by major differences in the quality of the various items being handled). Consequently, the development of image acquisition and processing systems for such applications has demanded increasingly better performance, in terms of quality, specialization and processing speed, from both the image acquisition unit and the first "low-level" processing module, i.e. based on relatively simple algorithms but handling an enormous amount of data.

SUMMARY OF THE INVENTION

The aim of the present invention is to provide a flexible image acquisition and processing system of the aforementioned type, but which presents a number of improved performance features, such as, modular design enabling adaption to various types of optoelectronic transducers; automatic compensation of acquisition unit errors, for ensuring that, during the image acquisition process, the final quality of the image reproduced electronically is unaffected by numerous noise sources which, if not compensated for, could impair subsequent processing; automated installation and debugging of the acquisition unit, both of which are fairly painstaking procedures, particularly in situations requiring precise enlargement factors, and/or under difficult image focusing conditions; and built-in self-diagnosis features; and which also enables, in the first low-level processing module, real-time employment of a class of commonly used algorithms, by virtue of a modular, programmable structure enabling extensive application scope.

Further aims and advantages of the system according to the present invention will be disclosed in the following description.

With this aim in view, according to the present invention, there is provided a flexible image acquisition and processing system comprising photosensor means supplying analogue output signals for compensating and digital conversion means supplying digital output signals representing the said image; timing means for controlling scanning of the said photosensor means; means for performing two-dimensional convolutions of the data representing the said image; and means for controlling the operating phases of the said system; characterised by the fact that the said control means comprise a processing unit for calculating first compensating values for standardising to a given value the analogue output signals for single photoelements on the said photosensor means under dark conditions, and for calculating second compensating values for standardising the output signals for the said single photoelements on the said photosensor means under normal lighting conditions of the scene defining the said images, the said first and second compensating values being stored in a nonvolatile memory on the said control means; the said control means also being designed to select and modify the operating coefficients employed by the said convoluting means.

BRIEF DESCRIPTION OF THE DRAWINGS

One embodiment of the present invention will be described, by way of a non-limiting example, with reference to the accompanying drawings, in which.

DETAILED DESCRIPTION OF THE INVENTION

Figure 1:
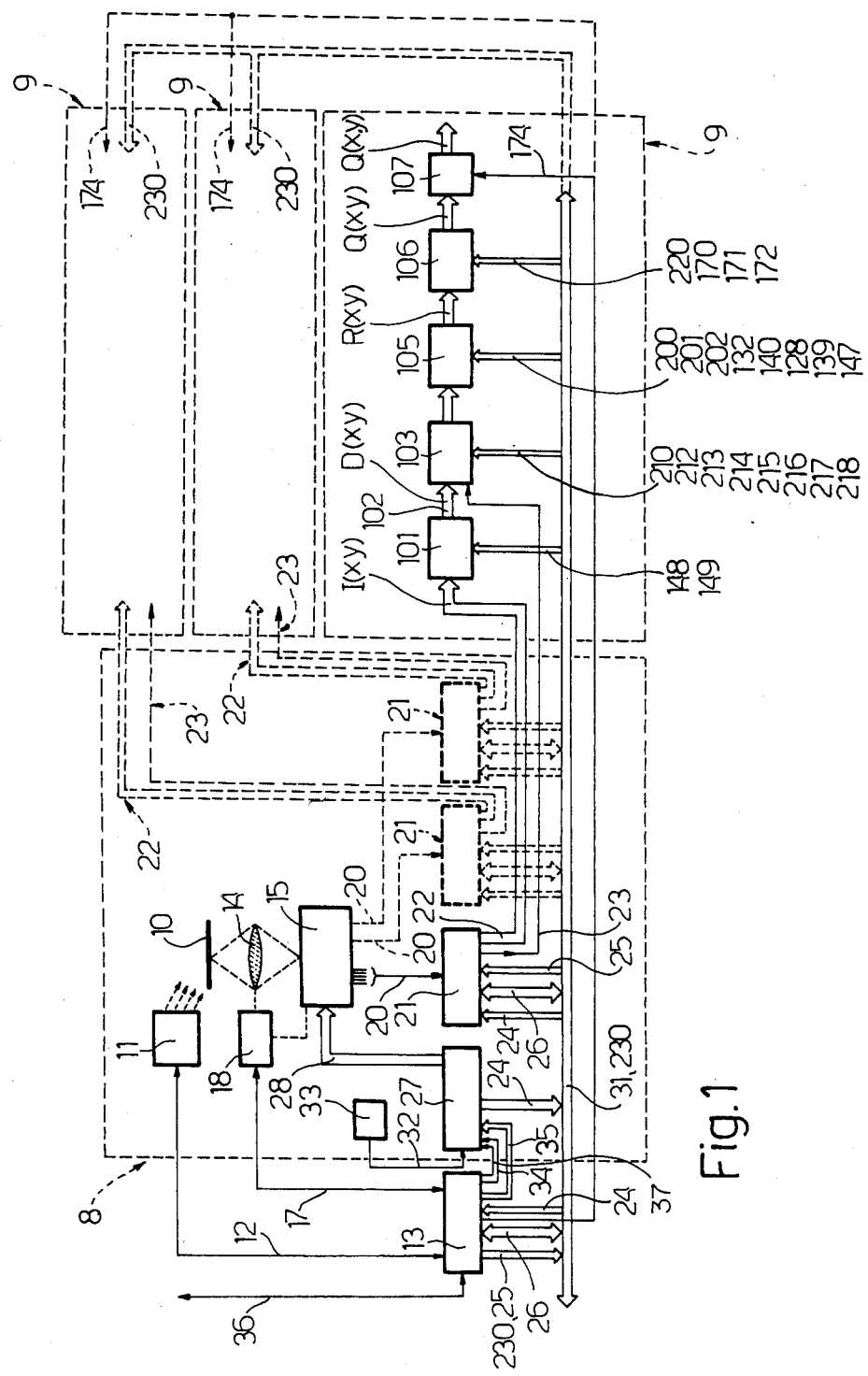
FIG. 1 shows a block diagram.

In FIG. 1, the dotted lines numbered 8 and 9 respectively indicate an image acquisition unit and a number of image processing units according to the system of the present invention and controlled by a control block 13. Number 10 indicates the plane of an object the image of which is to be acquired and which is lighted by a lighting device 11 controlled, via line 12, by control block 13. Via an optical focusing element 14, the image is formed on a photosensor block 15 which, as described in more detail later on with reference to FIG. 2, contains an electrooptical transducer 16, consisting of a one- or two-dimensional matrix of photosensitive cells, and a number of electric signal conditioning circuits enabling remote operation of block 15 off the processing electronics frame. Via line 17, control block 13 controls a positioning block 18 for adjusting the position of both optical element 14 and electrooptical transducer 16 on photosensor block 15 so as to achieve the required enlargement and optimum focusing of the image. Via lines 20, the outputs of photosensor block 15 go to a processing and analogue-digital conversion block 21, which provides for electrically conditioning the video signal, introduces compensating components as described in more detail later on, and provides for multilevel digital conversion of the video signal, so as to supply, on output lines 22, digital signals representing the acquired image, and, on output line 23, an image sync signal. The said block 21 also exchanges data lines 26 with control block 13, from which it receives instruction lines 25, and, together with control block 13, receives address lines 24 from a programmable timing block 27 containing timing modules for scanning the images on photosensor block 15, to which it is connected via lines 28, as well as for timed scanning of the addresses with lines 24. Blocks 13, 21 and 27 communicate over main line 31.

The output of photosensor block 15 may be connected to a number of blocks 21, for increasing the processing speed of the image acquisition unit. Timing by block 27 may also be controlled by a line 32 connected to an external block 33 for controlling the mechanical feed rate of an object to be picked up on plane 10. Block 27 also receives control signal lines, 34, 35, 37, from control block 13, as described in more detail later on.

Each group of output lines 22 goes to the input of a processing section of a respective unit 9 which comprises, in cascade formation, blocks 101, 103, 105, 106 and 107, which will be described in more detail later on and which are controlled by respective lines on control block 13, the said lines being indicated by common lines 230 and a separate line 174.

The said control block 13 is the intelligent part of the system and comprises a microprocessor for supervising the entire acquisition and processing procedure. In more detail, the said block 13 performs the following functions: initialization and configuration of acquisition unit 8 for a given task;

calculating and storing, in non-volatile memories, error compensation parameters for processing block 21;

calculating the optical enlargement factor, checking the image focus, and subsequently emitting parameters for correcting the position of lens 14 and photosensor block 15 via control of positioning block 18;

controlling communication with an external processor via line 36;

controlling lighting device 11;

system module and connection diagnosis;

enabling video data acquisition from external signals supplied by photocells, microswitches, etc.;

image data convolution control via two-dimensional matrixes of individually programmable coefficients for block 105;

applying scalar functions to image data, via blocks 101 and 106, and controlling operating blocks 101, 103, 106 and 107 during the various image processing phases.

Figure 2:
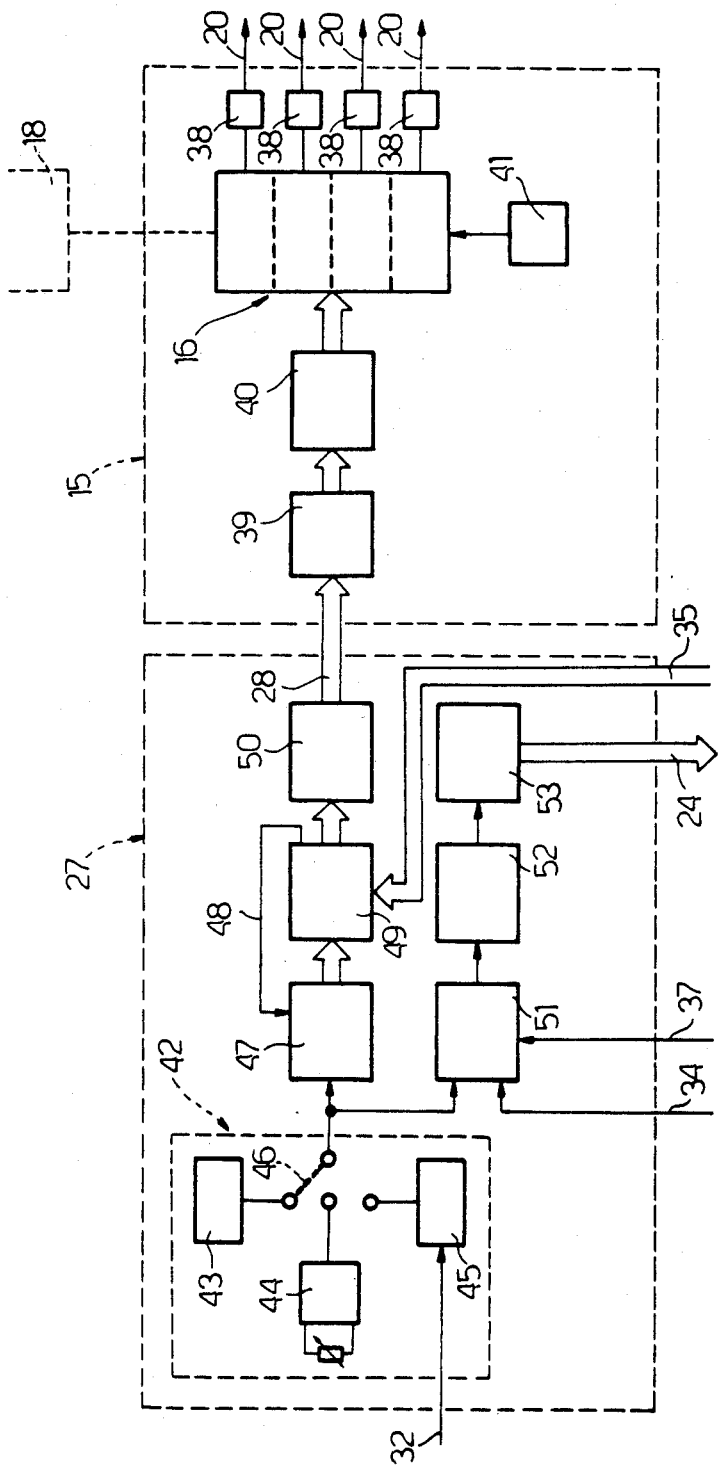
FIGS. 2, 3 and 4 show more detailed block diagrams of circuit blocks in FIG. 1.

Photosensor block 15, shown in detail in FIG. 2, is the only block on the image acquisition unit of the system according to the present invention which varies from one application to another, though it is of sufficiently general design to cater for a number of applications at one time. Electrooptical transducer 16 consists of a linear matrix of self-scanning photoelements, having N (e.g. 1024) elements divided into K (four in the example) segments. Electrooptical transducer 16 provides for converting light energy into electric signals, which are supplied sequentially to the four output lines 20 of the four segments. As the direct output of electrooptical transducer 16 is usually characterised by the type of technology employed (MOS, CCD, CID, etc.), output lines 20 are provided with an adapter stage 38 the output of which provides, for each photoelement on transducer 16, a grounded, stabilized, i.e. transientfree, voltage throughout most of the sampling period. The signals on output lines 20 of photosensor block 15 are thus standardised, and provide for employing subsequent processing blocks 21 totally independent of the technology of the photosensor. In the case of CCD photosensors 16, the video output signal is usually superimposed on a fairly high continuous component, which makes direct processing difficult. In this case, adapter stage 38 consists of a circuit for extracting the alternating signal component and restoring its continuous component to a more appropriate level. In the case of MOS photosensors 16, the video signal consists of a sequence of pulses with a very steep switching edge, followed by an exponential decline. In this case, adapter stage 38 provides for cyclically integrating the pulse, so as to produce a constant wave form in the second half of the sampling period when the input pulse has run out.

Photosensor block 15 receives image scanning phase control signals via lines 28 and the series connection of a differential receiving block 39 and a level converting block 40, the respective functions of which two blocks 39 and 40 being to receive the timing signals from block 27 and to convert the voltage levels to those required by electrooptical transducer 16. The advantages of differential transmission of the timing signals by block 27 is that it ensures high-frequency operation of block 15, regardless of its distance from block 27, thus ensuring considerable protection against external interference. Block 40 therefore provides for generating extremely high-amplitude wave forms (some photosensors 16 even require 15-20 Vpp) capable of piloting high capacitive loads. Supply to electrooptical transducer 16 and the required bias voltages are provided by supply block 41.

As already stated, programable timing block 27 can control various types of photosensor blocks 15, the operating mode of which may be varied by appropriately programming block 27. The said block 27 comprises a first block 42 for generating the image scanning frequencies and, in turn, comprising three separate clocks, 43, 44, 45; the first of which is quartz-based and, therefore, provides for a high degree of precision and stability; the second of which is of variable frequency and, therefore, adaptable to various operating conditions; and the third of which is connected to an external sync element, in this case, line 32 connected to block 33 which, by transporting the object, conditions the formation of the relative image. Switch 46 provides for selecting the type of clock, 43, 44 or 45, best suited for any given application. The selected clock signal is sent to a cyclic digital count block 47 the count period of which depends on the number of photoelements on transducer 16. The said count block 47 receives a reset signal 48 from a block 49 which actually generates the said clock signals; which reset signal 48 is formed by storing the wave forms of the signals controlling the photoelements on trasducer 16 in RAM memories, which are written in, when the unit is turned on, via a group of lines 35 from control block 13.

The content of the said RAM memories is therefore specific for each transducer 16 and, at the end of each scanning cycle addressed by block 47, a preselected cell in the said memories determines reset signal 48 for block 47. Should permanent storage of the data in block 49 be required, PROM memories may be used, in which case, the write procedure each time the unit is turned on may be dispensed with. The scanning signals from block 49 are sent to lines 28 via a differential transmitting block 50 for converting the signals from TTL logic to differential levels, thus enabling the said scanning control signals to be transmitted over relatively long distances. The timed scanning signal from block 42 is also sent to a block 51 for selecting timing of the addresses determined by lines 24, which condition the data acquisition phases. The said block 51, which is controlled by block 13 via line 37, also receives another address clock signal generated by the block 13 program via line 34. Block 51 thus allows the microprocessor on block 13 access, at a different frequency, to sections of the unit normally operating at video frequency and thus not permitting realtime access. The output of block 51 goes to a programmable delay block 52 which, for the signals on address lines 24, provides for recovering the delay of the video signal and the relative processing electronics in block 21 in relation to the scanning control signal on lines 28. The said block 52 is of vital importance in applications involving very high scanning frequencies, and in which the delays of the various blocks are, therefore, no longer negligible. The output of block 52 goes to block 53 which comprises a counter for generating the address signals on lines 24, which are supplied for both block 21 and block 13 as described in more detail later on.

Figure 3:
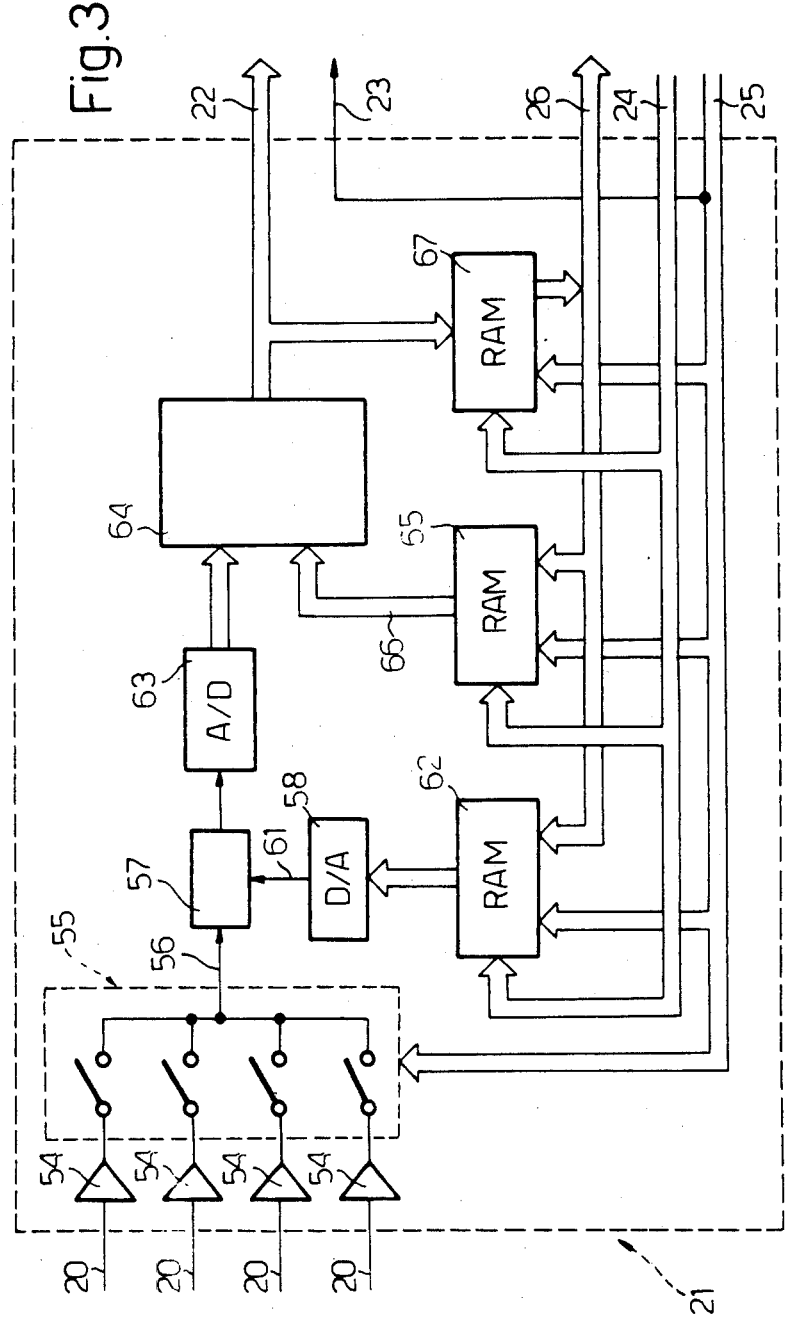

As shown in detail in FIG. 3, block 21 receives, from block 15, lines 20 supplying video signals in analogue form; which signals are sent, via respective input stages 54 (BUFFERS) consisting of unit gain signal amplifiers with an input stage compatible with video signals, to the inputs of an analogue scanner 55 controlled by instruction lines 25 and which provides for switching the incoming video signals onto output 56, e.g. for optimizing system configuration in the case of parallel-output photosensors 16 not used at high frequencies. Output 56 goes to adding and amplifying block 57 which receives, from digital-analogue converting block 58, first compensating values 61 for each single element on photosensor group 16, for standardising the output value to zero under dark conditions. The digital signals are sent to block 58 from a RAM memory block 62 containing the said compensating values. The said memory block 62, which is connected to data lines 26 and receives address lines 24 and instruction lines 25, is loaded by control block 13 each time the unit is turned on, and is of sufficient capacity for individually compensating the single elements on photosensor group 16.

Via a conveniently FLASH type analogue-digital converter block 63, i.e. having a sufficiently short conversion time for dispensing with a sampling and storage stage upstream, the output of block 57 goes to a first input of a multiplying block 64 which gain-corrects the response of each single element on photosensor group 16, so as to standardise its light sensitivity. The other input of the said multiplying block 64 receives second values 66 for compensating the gain of single elements on photosensor group 16, which values are supplied by a RAM memory block 65 also connected to data lines 26 and which also receives address lines 24 and instruction lines 25 and is loaded by control block 13 each time the unit is turned on. Multiplying block 64 may be replaced by a RAM or ROM memory block used as a LOOK-UP table. The output of multiplying block 64 supplies, on lines 22, the digital video output signals representing the image, which signals are also supplied to a RAM memory block 67 also connected to data lines 26, address lines 24 and instruction lines 25, and which is used as a transit memory by the microprocessor on control block 13 for deferred access to data acquired at video frequency.

Figure 4:
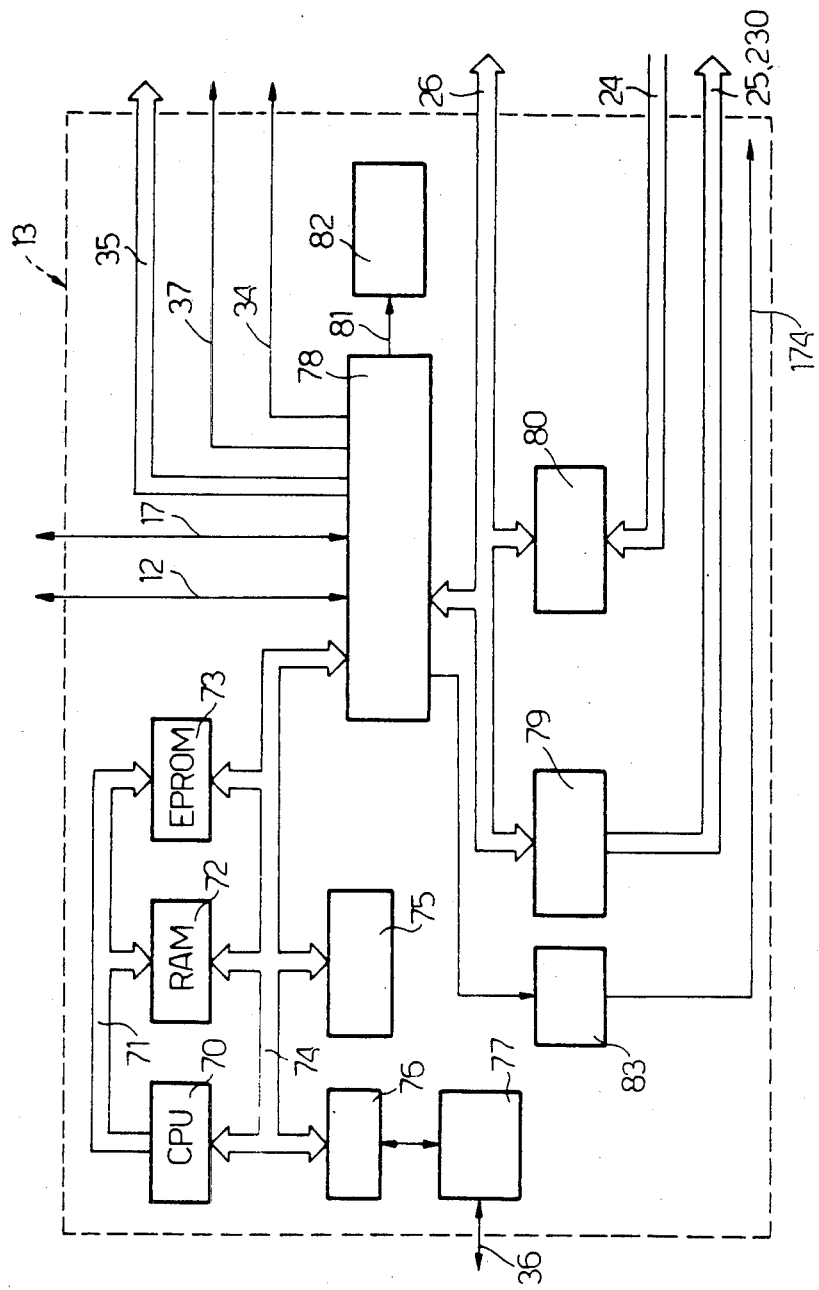

As shown in detail in FIG. 4, control block 13 comprises a central processing unit 70 which, in conventional manner, via a multiple internal address line 71, is connected to a RAM memory block 72 and an EPROM memory block 73. Central processing unit 70 is therefore connected, via a multiple internal data line 74, to: memory blocks 72 and 73; a programmable timing block 75; a series interface block 76, in turn, connected to an external interface block 77 connectable, via line 36, to an external processor; and a parallel input/output block 78 enabling access to the video signal acquisition and processing blocks. In particular, the said block 78 is connected to data line 26, in turn connected to a block 79 constituting a microprogrammable unit, and to a block 80 comprising a non-volatile memory. The said block 79 is connected to external instruction lines 25 and 230 for generating video frequency controls. In particular, line 230 comprises various control lines for blocks 101, 103, 105 and 106, the connection details of which will be described with reference to FIGS. 9, 10, 11 and 12. For increasing flexibility, the microprogram memory is a read-and-write type accessible by the microprocessor, which means changes may be made to the program even during the operating phases. Non-volatile memory block 80, which receives address lines 24, is accessible by the microprocessor for both reading and writing, and usually contains the compensating values for single elements on photosensor group 16, as well as other setting parameters. Input/output block 78 is connected to lines: 12 for controlling lighting device 11; 17 for controlling positioning block 18 regulating the image enlargement factor and focus; 34 and 37 to selecting block 51; 35 to memory block 49; as well as to line 81 connecting a local alphanumerical display block 82 for displaying diagnosis messages and operator reports in the case of interactive applications; and a line for block 83 from which originates control line 174 for block 107. Image acquisition unit 8 of the system according to the present invention provides for fully automatic initial setting when installed, as well as for fully automatic operation each time the unit is turned on.

In the first, initial setting, phase, central processing unit 70 on control block 13 automatically tests the memories on blocks 13, 21 and 27, and the various communication lines, and informs the operator of any faults detected. Microprocessor 70 then calculates and implements the distance between photosensor group 16 and the plane 10 of the object to be scanned, as well as mutual positioning of optical element 14 and photosensor group 16 for ensuring optimum focusing of the image. The distance between photosensor group 16 and object plane 10 ($D_{FO}$) is calculated by microprocessor 70 according to the following equation:

$$D_{FO} = 2F + FI + F/I + D_{pp}$$

wherein:
F = focal length of optical element 14;
$D_{pp}$ = distance between the principal planes of optical element 14 (may even be negative);
I = selected enlargement factor, equal to the ratio between the height of photosensor group 16 and the height of the scanned zone.

After calculating distance $D_{FO}$, microprocessor 70 controls, via block 18, correct positioning of photosensor group 16, and then prepares for adjusting focus. This is done using reference sights on object plane 10, which sights consist, for example, of equally-spaced horizontal lines of known size extending over most of the scanning zone. The principle adopted consists in a black-white and white-black transition analysis by microprocessor 70, which transistions, in the event the image is out of focus, involve a large number of photoelements. Optimum focusing, on the other hand, is achieved when the number of photoelements with a grey level midway between the initial and final transition levels is minimum. In the case in question, microprocessor 70, using the data from block 67, analyses the sight image by adding, along all the transitions, the number of photoelements at mid level. Once this number is obtained, microprocessor 70 activates block 18, so as to slightly adjust the position of optical element 14, and then performs another count. By repeating this process several times, the position of optical element 14 corresponding with the minimum number of mid grey level photoelements, and therefore optimum focusing, is located. This provides for the best mean focus of the image, which would otherwise be difficult to determine manually. Image acquisition unit 8 of the system according to the present invention may, however, provide for privileged focusing of given image zones by simply restricting transition analysis to those particular zones. As the sight line spacing is known, the enlargement value may be checked at the end of the operation by making a further position change if required (if distance $D_{FO}$ is altered, the focusing procedure must, of course, be repeated). At this point, the system determines the unit 8 error compensating values, which errors are corrected with two compensation components determined individually for each single element on photosensor group 16: one is an addition type for compensating offset voltages (throughout the analogue processing stages) and the dark photosensor signals; the other is a multiplication type for correcting irregularities in terms of photosensor response, lighting and light energy transmission by optical element 14. The basic operations in the said compensation procedure are as follows. Microprocessor 70 on control block 13 sets a gain compensation constant (block 65 in FIG. 3) of 1 for all the photoelements, and proceeds to acquire an image under dark conditions.

With reference to FIG. 3, the signal from each line 20 is analysed via block 67, and control block 13 calculates the constants enabling single photoelement responses to be standardised and reset. The calculated compensation constants are then loaded into individual cells on memory block 62. At this point, microprocessor 70 activates the image acquisition of an object of uniform reflectivity (or transmissivity) under normal lighting conditions. The signal from each line 20 (FIG. 3) is analysed, and a calculation made of the constants enabling single photoelement responses to be standardised. This calculation may be performed, for example, by calculating the mean value of the photoelement responses and introducing, for each, a multiplication factor for bringing the response back to exactly the said mean value. Microprocessor 70 then controls storage of the said compensation constants in memory block 65 (FIG. 3) and rechecks the setting: if the results do not check out, the above procedures are repeated, but starting from the compensations calculated in the foregoing cycle. Once setting has been completed, microprocessor 70 enters the compensation data into non-volatile memory block 80. At this point, the normal image acquisition phase may commence, whereby block 27, via lines 28, supplies the scanning sequence signals for individual elements on photosensor group 16, and, accordingly, the signals on address lines 24, conveniently delayed by block 52 via blocks 62 and 65 of processing block 21, supply the first compensating values 61 added in block 57 for each individual photoelement, and the second compensating values 66 governing the gain of multiplying block 64 for each individual photoelement, so as to obtain appropriate compensation of the video signals on output lines 22. Each time image acquisition unit 8 of the system according to the present invention is turned on, microprocessor 70 tests the memories on blocks 13, 21 and 27, checks the data in non-volatile memory 80 matches a given check code, and proceeds to load the compensating value data into RAM memories 62 and 65 on block 21 and, possibly also, the cells of RAM memory 49, after which, the unit is ready to operate for acquiring images as described previously. Again with reference to FIG. 1, processing unit 9 of the system according to the present invention comprises a first block 101 which applies a programmable scalar function f to the input data I(x,y) on lines 22 and representing the individual intensity values of the unprocessed image, so as to give a converted value of:

$$D(x,y)=f[I(x,y)].$$

This conversion in block 101 provides for numerous possibilities, e.g. introducing data significance thresholds, expanding or contracting given input value ranges, positive-negative image conversion and vice versa. Output signals 102 from block 101 are sent to an input data processing block 103 which also receives, from line 23, the video data sync signals sent to block 101. The output of block 103 is sent to block 105 which is the main core of unit 9 and provides for convolutive filtering of the image via a two-dimensional matrix of individually programmable weights, to give an output value of:

$$R(x, y) = \sum_{M=-L}^{L} \sum_{N=-H}^{H} W_{HN} D(X - M, Y - N)$$

wherein:
  W = coefficient matrix;
  2L+1, 2H+1 = coefficient matrix dimensions.

Convoluting block 105 presents a systolic structure, i.e. in the form of a network of processing cells for synchronously calculating and supplying data through the structure itself. The output of block 105 is sent to a processing block 106 which applies a scalar function g to the convolution results, so as to give a converted value of:

$$Q(x,y)=g[R(x,y)].$$

The output of block 106 is then sent to block 107 which constitutes an output interface on the processing unit.

Figure 5:
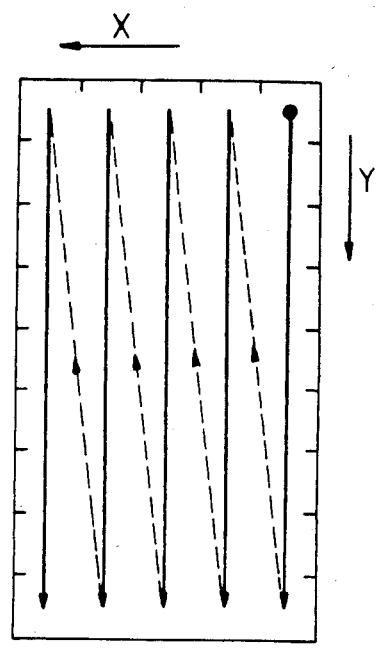
FIGS. 5, 6 and 7 show indicative portions of images processed using the system according to the present invention.
Figure 6:
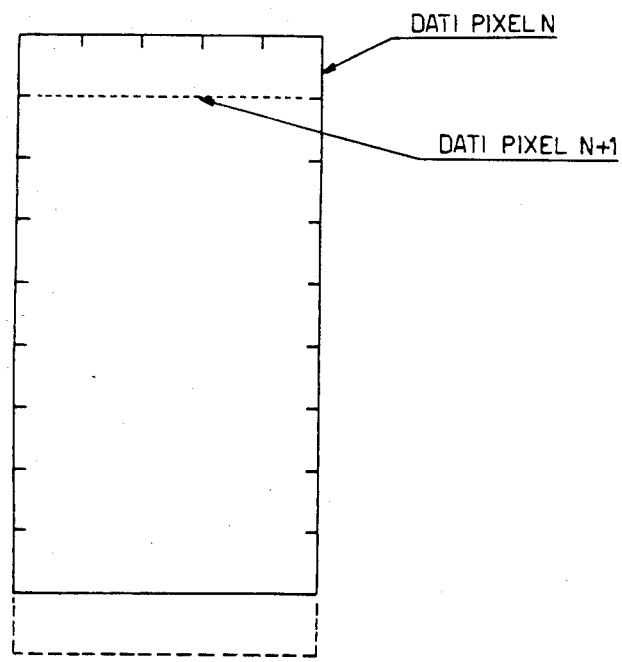

As already stated, blocks 101, 103, 105, 106 and 107 are all controlled by control block 13, as described in more detail later on, via lines indicated as a whole by 230. Of the operations performed by processing unit 9 of the system according to the present invention, the convolutions calculated in block 105 are the most taxing in terms of HARDWARE implementation, in that, the extremely high frequency of the input data and the number of operations required for each individual image pixel demand highly parallel structures. Block 105, which, as already stated, presents a systolic structure, therefore provides for extremely high calculating capacity, while at the same time optimising data flow through the structure. Elementary calculating cell N in FIG. 8, which will be described in more detail later on, is based on a multiplier-accumulator group, and performs a complete calculation relative to one image pixel. For simplifying input and output data flow, the structure of each individual processing cell N exploits the fact that the data matrixes of two adjacent pixels share $(N_y-1)$ lines, $N_y$ being the y axis dimension of the matrix, as shown in FIGS. 5 and 6. Offsetting the start of the calculation by one cycle results in the multipliers of two adjacent cells working on the same data (obviously with different coefficients) for $(N_y-1)$ lines. What is more, the end results are also offset, which means the said data may be routed onto one line. For the data line not shared by both multipliers, each cell refers to the actual data lines, the number of which depends on architectural scope.

Figures 7A, 7B:
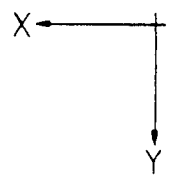

To give an example of the operating principle involved, let's consider the calculation of a two-dimensional convolution of $3 \times 9$ pixels as shown in FIG. 7. This shows the data areas relative to N and N+1 pixels extracted from the image data matrix. As illustrated, the calculation is performed along the y axis and shifts over to the x axis at the end of each data column. FIG. 7 also gives an indication of the sequence in which data and coefficients (FIGS. 7a and 7b respectively) are to be sent to the multiplier input of the N and N+1 pixel calculating cells:

N pixel
data $D_{100}, D_{101}, \ldots D_{108}, D_{200}, \ldots D_{208}, D_{300}, \ldots D_{308}$
coeff. $W_0, W_1, \ldots W_8, W_9, \ldots W_{17}, W_{18}, \ldots W_{26}$ N+1 pixel
data $D_{101}, D_{102}, \ldots D_{109}, D_{201}, D_{209}, D_{301}, \ldots D_{309}$
coeff. $X_0, W_1, \ldots W_8, W_9, \ldots W_{17}, W_{18}, \ldots W_{26}$.

Figure 8:
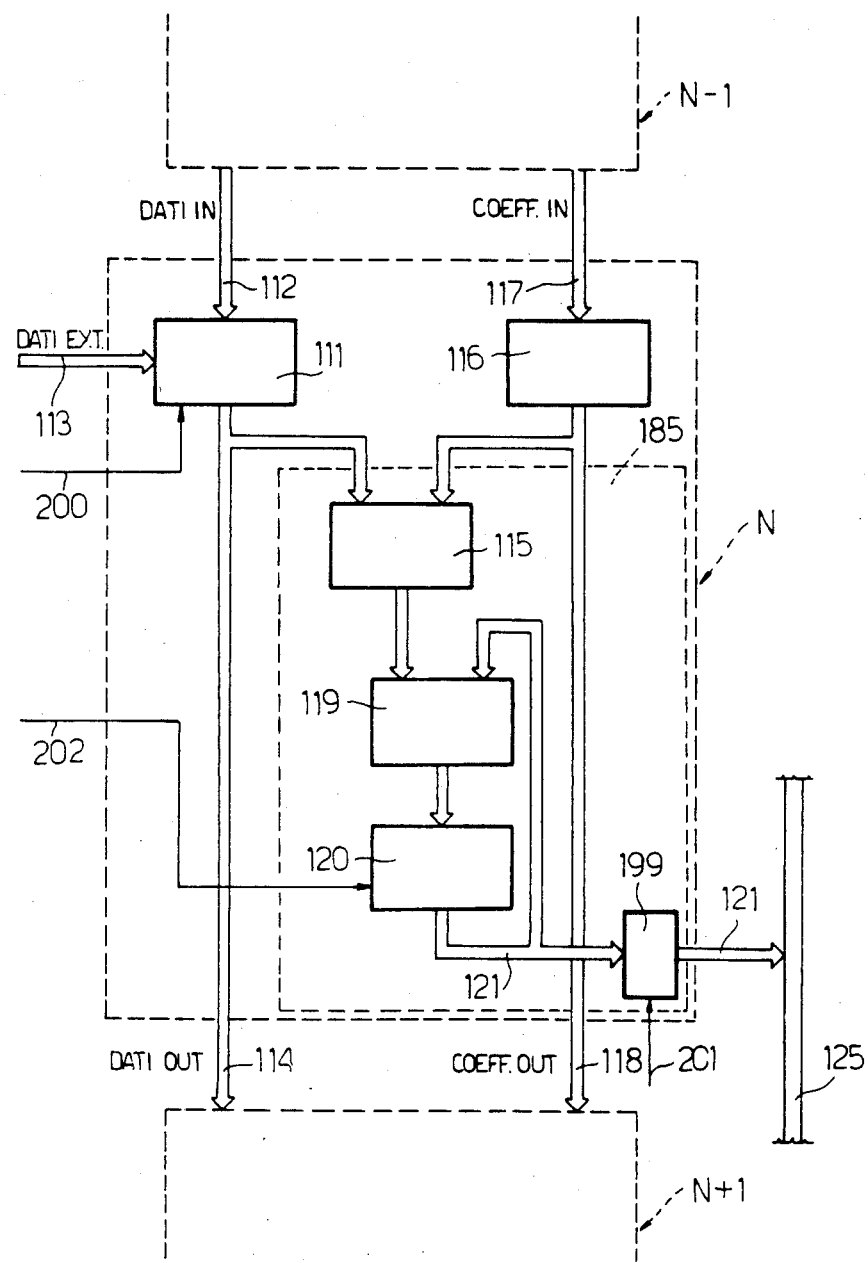
FIG. 8 shows a block diagram of an elementary calculating cell on a processing module of the system according to the present invention.

As the above two data sequences obviously differ in only three respects, by offsetting the start of the calculation by one cycle, both multipliers work for 24 out of 27 cycles on the same data, which obviously applies also to the coefficient sequence. As shown in FIG. 8, each elementary cell N presents a selecting block 111 controlled by an instruction line 200 on block 13 and having a first data input 112 (usually from a foregoing (N−1) cell) and a second data input 113 from an external line. Output 114 of selecting block 111 supplies output data to successive selecting blocks 111 of the cells downstream. The output of selecting block 111 also goes to a first input of a multiplying block 115 which receives, at another input, the output of a register 116 having a input 117 and an output 118 and which supplies coefficients to successive cells N in cascade formation, while at the same time introducing a one-cycle delay between each cell. The output of multiplying block 115 goes to an adding block 119 which supplies its output to an accumulating register 120, the output 121 of which is sent to the other input of adding block 119 and also flows onto an output line 125, common to all the cells, via a gate block 199 enabled by line 201 from control block 13 at the end of the data matrix calculation. Blocks 115, 119, 120 and 199 combine to form main block 185.

The said accumulating register 120 is controlled by an instruction line 202 of block 13, which resets the partial sum in the said accumulator 120 whenever a convolution calculation is initiated for a new data matrix.

Figure 9:
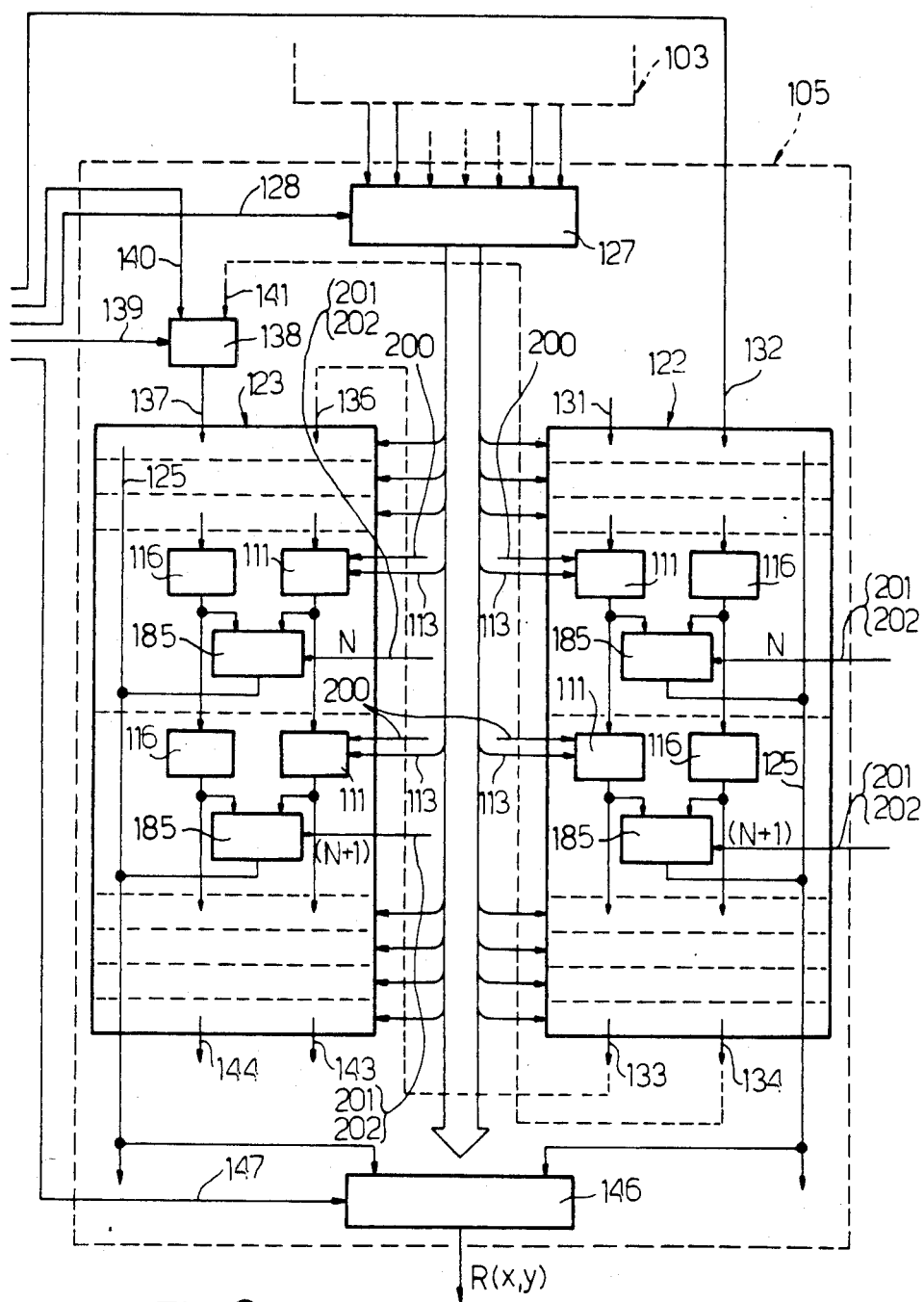
FIG. 9 shows a block diagram of the convoluting means on the system according to the present invention.

FIG. 9 shows one embodiment of convoluting block 105, which presents two groups, 122 and 123, each consisting of a number of elementary calculating cells N connected in cascade formation and of which only the Nth and (N+1)th cells are shown in detail. External data lines 113 for selecting blocks 111 come from a selecting block 127 controlled, via lines 128, by control block 13 and receiving the output lines from data processing block 103. The function of the said selecting block 127 is to reduce the number of data lines inside block 105. Group 122 presents, for the first cell, a data input 131, and a coefficient input 132 connected to control block 13; and, from the last cell, a data output 133 and a coefficient output 134.

At the input to the first cell, group 123 presents a data input 136, and a coefficient input 137 consisting of the output of a selecting block 138 controlled, via line 139, by control block 13 and having, at its inputs, a first line 140 from control block 13, and a second line 141 which may be connected as described in more detail later on. From the last cell, the said group 123 presents a data output 143 and a coefficient output 144. The two output lines 125 of groups 122 and 123 go to two inputs on an arithmetical unit 146 controlled, via line 147, by control block 13 and which supplies the output data (R(x,y) from block 105. The said arithmetical unit 146 may conveniently add, subtract, add the absolute values of, or select either one of the said two inputs.

The said two groups 122 and 123 may be connected in cascade or parallel formation. In the case of a cascade connection, all the cells operate with a single coefficient matrix, and data output 133 of group 122 is connected to data input 136 of group 123, whereas coefficient output 134 of group 122 is connected to input 141 of selecting block 138, as shown by the dotted line. Selecting block 138 connects input 141 to its output 137 and, accordingly, arithmetical unit 146 alternatively selects for its output the input from group 122 or 123.

In the case of a parallel connection, there are no dottedline connections from outputs 133 and 134 of group 122, and selecting block 138 connects its output 137 to input 140. Thus, each cell in group 122 works on the same data as its counterpart in group 123, but with different coefficient matrixes as determined by control block 13 via lines 132 and 140; the partial results later being combined in final arithmetical unit 146.

Figure 10:
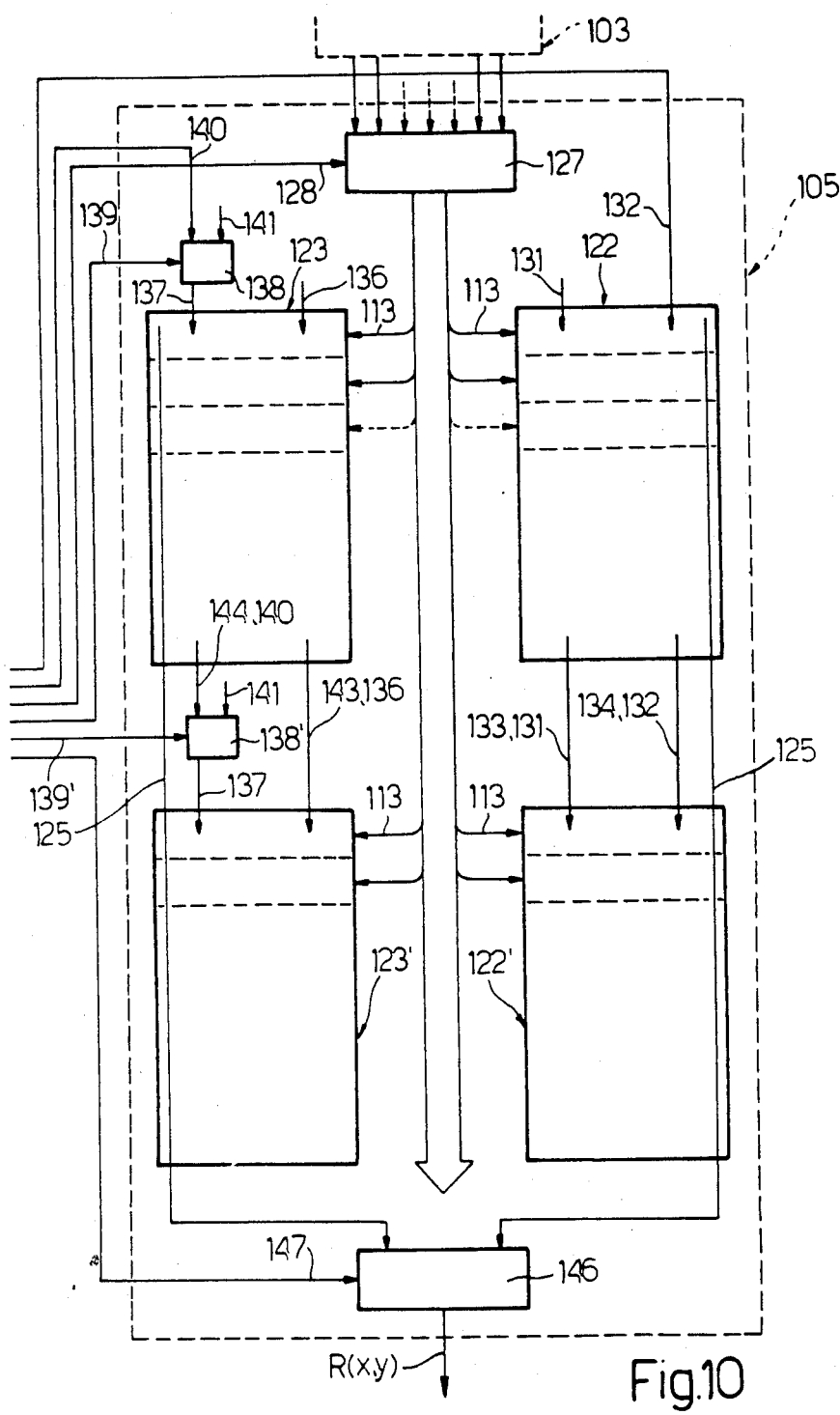
FIG. 10 shows a block diagram of a variation of the said convoluting means.

The structure of elementary calculating cell N in FIG. 8 and, consequently, groups 122 and 123 are designed for enabling further higher-level expansion by providing further cascade- or parallel-operating modules, as shown in FIG. 10, where a group 122' is series-connected to group 122, with data and coefficient outputs 133 and 134 of group 122 going to respective data and coefficient inputs 131 and 132 of group 122', whereas a group 123' is cascade-connected to group 123, with data output 143 of group 123 going to data input 136 of group 123', and coefficient output 144 of group 123 going to input 140 of a selecting block 138' controlled, via line 139', by control block 13, and at the input of line 137 of group 123'. Output lines 25 of the two cascade-connected groups, 122 and 122', 123 and 123', go to the two inputs on arithmetical unit 146.

Figure 11:
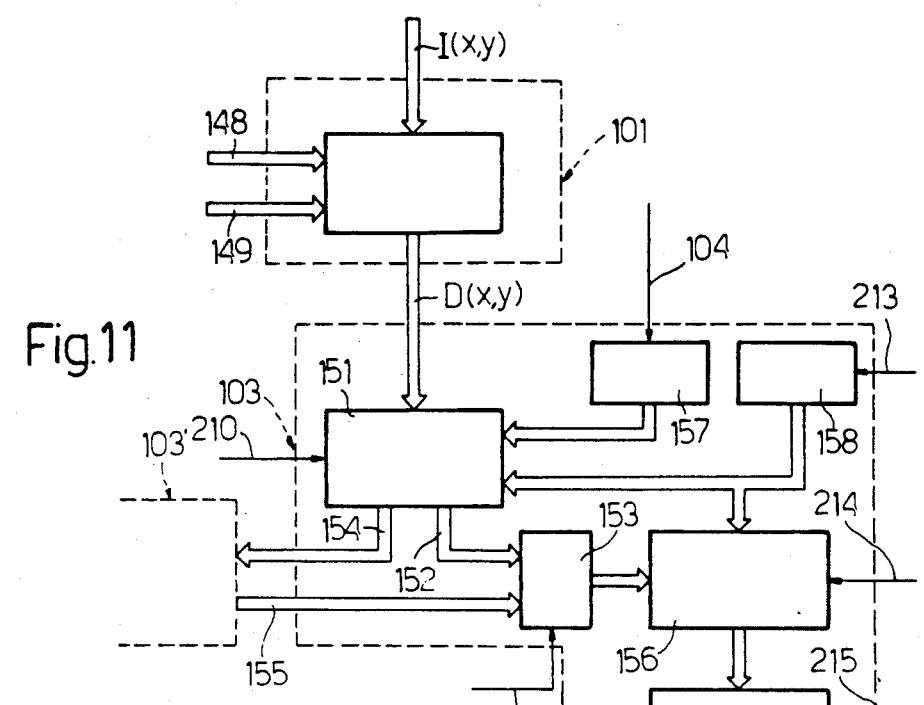
FIGS. 11 and 12 show more detailed block diagrams of other circuit blocks in FIG. 1.

With reference to FIG. 11, block 101 substantially consists of a RAM or ROM (look-up) memory addressed by input data item I(x,y) and the content of which implements the specific conversion function in question. In the case of a RAM memory, this receives data lines 148 and instruction lines 149 from control block 13, and is loaded by control block 13 during the turn-on sequence. The said RAM memory 101 may be organized in a number of banks selectable, via line 149, by control block 13. In this way, the implemented function may be switched rapidly with no need to rewrite the memory. Block 103 comprises an input memory block 151 which receives the output from block 101 and is designed to enable video data to be acquired fully asynchronously in relation to processing. The main advantage of this lies in its being compatible with video data sources of irregular frequency or available in bursts. The said block 151 may be formed, for example, from two RAM memories, each of which, when respectively loaded or unloaded, and via control line 210 from control block 13, is made alternatively available to upstream block 101 or the processing section downstream. The said memory block 151 presents a first output 152 going to a first input on a selecting block 153, and a second output 154 which is sent to a processing block 103' on another image processing unit 9, so as to exchange overlapping data between two processing units 9 operating on adjacent areas of the same image. Output 155 on block 103' therefore goes to the other input on selecting block 153, which is controlled by line 212 on control block 13 and provides for supplying processing memory 156 with the data acquired by block 101, or data relative to an edge portion of the image. The addresses for the RAM memory on block 151, which is connected to block 101, are generated by a block 157 activated by the input data sync signals on line 23. The said block 157 provides for reconstructing orderly sequences in the event the input data is not strictly sequential, e.g. as in the case of image sensors divided into parallel-scanned segments selectively sent onto a single data line. The RAM memory on block 151, which is connected to the downstream processing section of block 103, is addressed by a counter 158, incrementing of which is enabled by line 213 from control block 13, and which also addresses RAM processing memory 156, which stores a number of data columns equal to the maximum extension of one of the dimensions of the convolution matrix on block 105. The said block 156, which is controlled by line 214 fron control block 13, operates in sequential BUFFER mode, i.e. the latest column of in-coming data takes the place of the oldest column. The output of memory 156 goes to a block 161 also controlled by a line 215 from control block 13 and which resets the data sequence stored in memory 156 so as to rearrange the said columns according to the actual space sequence of the image. The rearrange function performed by block 161 is performed via an address check by line 215 using the coding on the signal for line 214 governing data storage in block 156.

The output of block 161 goes to a block 162 consisting of an arithmetical unit controlled by line 216 from control block 13, which block 162 provides for reducing the number of multiplications in the case of convolutions, in block 105, having a symmetrical coefficient mask, in which case, the corresponding data in the columns is added.

In cases not permitting such simplification, the said arithmetical unit 162 operates as a data selector.

The output of block 162 goes to a block 163 which acts as a back-up memory for the data lines in which the systolic processing cells on block 105 are connected. The said memory 163, which is controlled by lines 217 from control block 13, may also be implemented with delay lines of programmable length. The output of block 163 goes to block 164 which is also controlled by lines 218 from control block 13 and which withdraws the data from memory block 163 and sorts it out into the order required by the type of operation being performed on output data lines 165 which are then connected to the data inputs of systolic processing block 105, i.e. to block 127 in FIG. 9. Control lines 218 depend on the type and size of the convolution being performed, and also condition control lines 217 of block 163 which provides for offsetting data column supply as required by the systolic processing matrix.

Figure 12:
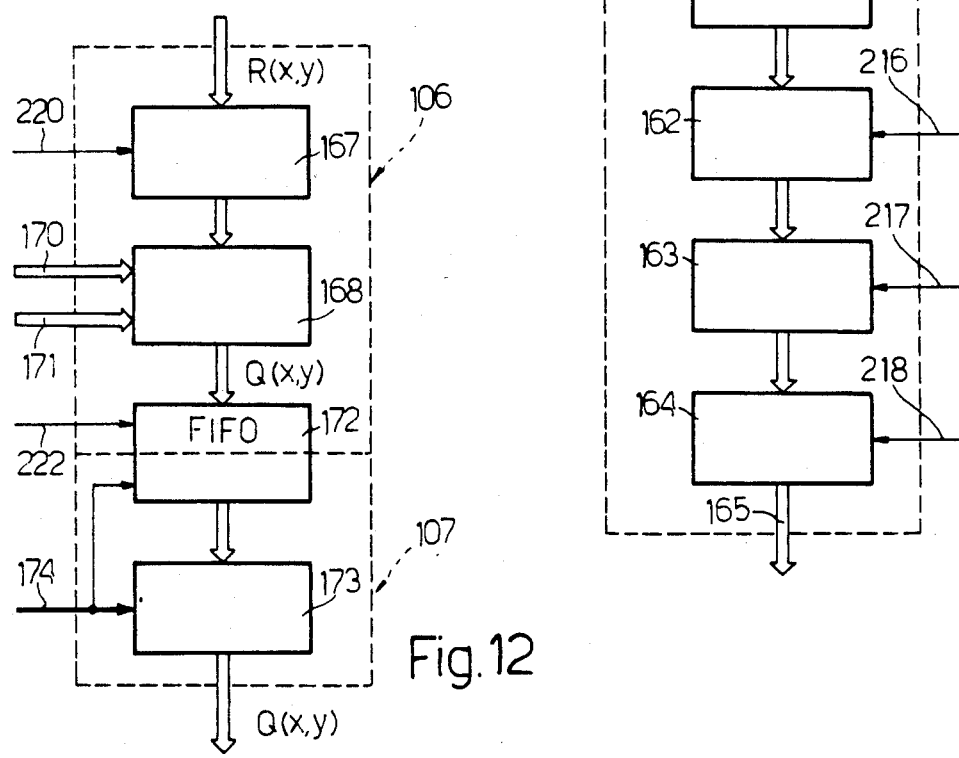

As shown in FIG. 12, the input of block 106 goes to a block 167 controlled by line 220 from control block 13 and the function of which is to reduce, whenever necessary, the word length of the results from processing block 105, either by extracting a window from the original data (by determining, via line 220, the position of the least significant data bit and the bit number of the said window) or by applying signal compression, e.g. logarithmic, functions. The output of the said block 167 goes to a block 168 consisting substantially of a RAM or ROM memory addressed by the processing results from compression block 167, and which implements the specific conversion function in question. In the case of a RAM memory, this receives data lines 170 and instruction lines 171 from control block 13, and is loaded by control block 13 during the turn-on sequence, as already described in connection with block 101. The RAM memory on block 168 may also be organized in a number of banks selectable, via control line 171, by control block 13. The output of block 168 goes to a FIFO buffer memory block 172 controlled by line 222 from control block 13 and which provides for transmitting data externally in asynchronous manner in relation to processing by block 105. The said block 172 also belongs partially to output block 107, which also comprises a block 173 of user interface control circuits, controlled, like the output section of block 172, by line 174 from control block 13.

The advantages of the flexible image acquisition and processing system according to the present invention will be clear from the foregoing description. In particular, as regards acquisition unit 8, unit errors are compensated automatically, the said compensating values being stored in a non-volatile memory so that, each time the unit is turned on, it provides automatically for establishing correction factors relative to various error sources, such as: irregularities in the response of electrooptical transducer 16, lighting block 11 and optical image focusing element 14, and varying electric levels of the signals introduced by the processing blocks. What is more, the repeat procedures introduced provide for minimising setting errors caused by random interference. Automated initial setting of the unit also ensures optimum debugging and consistent repeat performance from one unit to another.

Photosensor block 15 is the only personalized module on the unit, the characteristics of which vary according to the electrooptical transducer 16 employed. The presence of adapter blocks 38 and 40 down- and upstream from photosensor group 16 enables the other video signal processing blocks, particularly block 21, to be left unchanged. Acquisition unit 8 may be applied to image scanning systems operating at various resolution levels (by varying the number of electrooptical transducers 16) and scanning speeds. As such, provision is made for a modular configuration in terms of the number of electronic modules required, which depends on both scanning scope and speed, for fully exploiting the video signal acquisition channel for each application. Blcks 13 and 27 may be programmed for catering for various applications, whereas control block 13 presents built-in diagnosis procedures for direct fault signaling.

As for processing unit 9, systolic processing block 105 provides for convoluting the image via a two-dimensional matrix of coefficients which may be programmed individually, via unit 79 on control block 13, for enabling also realtime (on-line) modification of the convoluting filter response. Furthermore, the structure of the processing unit provides for performance times proportional with the size of the convoluting matrix on block 105. Microprogrammable unit 79 is capable of emitting high-speed controls by virtue of it, too, being controlled by an intelligent supervisory module based on microprocessor 70. Via connection 36, the said supervisory module also provides for troublefree insertion onto complex, heterogeneous processing systems. For simplifying external interfacing to the full, both input data processing block 103 and result transmitting block 107 are asynchronous, in relation to both each other and systolic processing block 105. Physical implementation of processing unit 9 is fully digital, which provides for numerous internal advantages, as well as troublefree diagnosis, compatibility with other processing systems, and no falloff in performance due to varying temperature. The modular design of systolic arithmetical processing block 105 means it may be expanded (number of elementary calculating cells N) according to the size of the convolution matrix and required performance time. Another interesting feature of processing block 105 is that it provides for convoluting the same data with two separate coefficient matrixes, the outputs of which are then combined. A number of convolution processing units may be parallel-operated over as many adjacent image portions, while at the same time preserving the correctness of the results, even in border areas, by virtue of a data exchange mechanism and selecting block 153 on input data processing block 103. In the event the columns on the convolution matrix present symmetrical coefficients, this may be exploited for reducing the number of operations to be performed, thus optimising processing configuration and/or performance time.

Providing a master microprocessor, via control block 13, enables connection to an external processor, which may easily govern the structure, both diagnostically and operationwise, with the possibility of condensing the operations performed by the architecture in "macroinstructions" generated directly by the external processor itself. As, obviously, neither microprocessor 70 nor the external processor can operate directly on the processing architecture of the unit, for reasons of speed, this is provided for by microprogrammable RAM-memory-based unit 79 which is programmed according to the required microinstruction and emits, in real time, all the control signals required for modules 101, 103, 105 and 106.

To those skilled in the art it will be clear that changes may be made to the embodiments of the flexible image acquisition and processing system described and illustrated herein without, however, departing from the scope of the present invention.

We claim:

1. A flexible image acquisition and processing system comprising photosensor means supplying analogue output signals (20) for compensating, and digital conversion means (21) supplying digital output signals (22) representing said image; timing means (27) for controlling scanning of said photosensor means (15); means (105) for performing two-dimensional convolutions of data representing said image; and means (13) for controlling said system; characterized by the fact that said control means (13) comprise a processing unit (70) for calculating first compensating values (61) for standardizing to a given value the analogue output signals (20) for single photoelements (16) on said photosensor means (15) under dark conditions, and for calculating second compensating values (66) for standardizing the output signals (22) for said single photoelements (16) on said photosensor means (15) under normal lighting conditions of said images, the said first (61) and second (66) compensating values being stored in a non-volatile memory (80) on said control means (13); said control means (13) also being designed to select and modify operating coefficients employed by said convoluting means (105).

2. A system as claimed in claim 1, characterized by the fact that said control means (13) determines automatically said first (61) and said second (66) compensating values in an initial setting phase of the said system, and automatically transfers said first (61) and said second (66) compensating values, each time said system is turned on, from said non-volatile memory (80) to respective first (62) and second (65) storage means in said digital conversion means (21).

3. A system as claimed in claim 2, characterized by the fact that said first storage means (62) in said digital conversion means (21) supplies a respective analogue signal (61) to a block (57) for adding it to the said analogue signal (56) supplied from a specific element (16) on said photosensor means (15); and that said second storage means (65) on said digital conversion means (21) supplies a respective digital signal (66) to a block (64) for converting the digital signal supplied from a specific element (16) on the said photosensor means (15).

4. A system as claimed in claim 1, characterized by the fact that said control means (13) calculates said second compensation value (66) as the mean of a number of samples of the said output signals (22) for the said single elements (16) of said photosensor means (15).

5. A system as claimed in claim 1, characterized by the fact that said control means (13) automatically calculates the distance ($D_{FO}$) between said photosensor means (15) and the object plane (10), and consequently controls positioning of said photosensor means (15).

6. A system as claimed in claim 1, characterized by the fact that said control means (13) controls positioning of an optical element (14) inserted between said object plane (10) and said photosensor means (15), and automatically detects optimum focusing of said images.

7. A system as claimed in claim 1, characterized by the fact that said control means (13) comprise a microprogrammable unit (79) for generating video-frequency controls for said digital conversion means (21).

8. A system as claimed in claim 1, characterized by the fact that said timing means (27) are controlled by at least one of fixed-frequency signals (43), variable-frequency signals (44) or signals (45) whose frequency is controlled by external means (32).

9. A system as claimed in claim 1, characterized by the fact that said timing means (27) supply enabling instructions (24) for the said first (61) and second (66) compensating values on said digital conversion means (21) via a delay block (52).

10. A system as claimed in claim 1, characterized by the fact that said timing means (27) supply scanning controls (28) for single elements (16) on said photosensor means (15) via a differential transmitting block (50), and that the said photosensor means (15) comprise a differential receiving block (39).

11. A system as claimed in claim 1, characterized by the fact that said photosensor means (15) comprise level converting (40) and/or adapting (38) stages up and downstream from said photoelements (16).

12. A system as claimed in claim 1, characterized by the fact that said photosensor means (15) comprise a number of groups of said photoelements (16), each having a respective output (20); the signals from the said outputs being made available in a required sequence via scanning means (55).

13. A system as claimed in claim 1, characterized by the fact that said control means (13) comprise a microprogrammable unit (79) for supplying said operating coefficients to said convoluting means (105).

14. A system as claimed in claim 1, characterized by the fact that said control means (13) comprise an interface (77) for connection to a processor.

15. A system as claimed in claim 1, characterized by the fact that said convoluting means (105) are systolic and comprise a number of elementary calculating cells (N) arranged in cascade formation, so that the data (114) and coefficient (118) outputs of each cell (N) go to corresponding data (112) and coefficient (117) inputs on a downstream cell,; each of said cells (N) comprising a selector (111) for selecting incoming data from the foregoing cell or from an external line (113); the output of said selector supplying the output data from the said cell and going to a multiplier (115) which receives the coefficient data from a register (116) for retarding by one operating cycle the supply of said data to said cascade-connected cells; the output of the said multiplier (115) being supplied to an adder (119) supplying an accumulating register (120) and whose output, which constitutes the operating output of said cell, also goes to another input on said adder (119).

16. A system as claimed in claim 15, characterized by the fact that it comprises at least two groups (112, 123) each comprising a number of said cascade-connected calculating cells (N).

17. A system as claimed in claim 16, characterized by the fact that the said groups (122, 123) may be series or parallel connected, and comprise a block (146) for selecting and combining the output data (125) of the said groups.

18. A system as claimed in claim 15, characterized by the fact that it comprises a block (127) for selecting external data lines (113) supplying said number of cascade-connected cells (N).

19. A system as claimed in claim 1, and including means (101, 103, 106) for processing said data representing said images up and/or downstream from said convoluting means (105).

20. A system as claimed in claim 19, characterized by the fact that said processing means (101, 103, 106) are controlled by said control means (13) for selecting and modifying processing parameters.

21. A system as claimed in claim 19, characterized by the fact that said processing means (101, 106) perform conversions by applying scalar functions to said data representing said images.

22. A system as claimed in claim 19, characterized by the fact that said processing means comprise look-up memories (101, 168).

23. A system as claimed in claim 19, characterized by the fact that said processing means comprise means (151, 172) for supplying output data at a different rate from that at which the input data is acquired.

24. A system as claimed in claim 13, characterized by the fact that said processing means (103) located upstream from said convoluting means (105) comprise means (153) for also selecting the data representing the images from external processing means, so as to complete said data relative also to the edge portions of said images.

25. A system as claimed in claim 1, comprising a number of said convoluting means (105) parallel-operating on groups of said digital signals (22) representing said image.

26. A system as claimed in claim 1, characterized by the fact that said timing means (27) comprise addressable storage means (49) for supplying scanning controls (28) for single elements (16) on said photosensor means (15); the content of said storage means (49) being determined by said control means (13).

27. A system as claimed in claim 1, characterized by the fact that said images are detected from documents (10) and comprise alphanumerical data and/or graphic marks.

28. A system as claimed in claim 27, characterized by the fact that said documents (10) comprise microfilms.

* * * * *